(12) United States Patent
May et al.

(10) Patent No.: US 9,312,899 B2
(45) Date of Patent: Apr. 12, 2016

(54) RADIO FREQUENCY (RF) RECEIVERS HAVING WHITENED DIGITAL FRAME PROCESSING AND RELATED METHODS

(71) Applicant: Silicon Laboratories Inc., Austin, TX (US)

(72) Inventors: Michael R. May, Austin, TX (US); Junsong Li, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/301,764

(22) Filed: Jun. 11, 2014

(65) Prior Publication Data

US 2015/0365117 A1    Dec. 17, 2015

(51) Int. Cl.
| H03K 9/00 | (2006.01) |
| H04B 1/16 | (2006.01) |
| H04L 7/00 | (2006.01) |

(52) U.S. Cl.
CPC ............... *H04B 1/16* (2013.01); *H04L 7/0079* (2013.01)

(58) Field of Classification Search
CPC ...... H04B 1/0003; H04B 1/38; H04B 1/0007; H04B 1/0028; H04B 1/005; H04L 2025/03414; H04L 2027/0024; H04L 27/2649; H03M 1/12
USPC ........................... 375/260, 346, 316; 341/155
See application file for complete search history.

(56) References Cited

U.S. PATENT DOCUMENTS

| 6,029,239 | A | * | 2/2000 | Brown ................... G06F 9/5016 370/331 |
| 6,130,578 | A |   | 10/2000 | Tang |
| 6,791,382 | B1 |   | 9/2004 | Ting et al. |
| 7,193,481 | B2 |   | 3/2007 | Luzzi |
| 7,272,373 | B2 |   | 9/2007 | Tuttle et al. |
| 7,471,940 | B2 |   | 12/2008 | Tuttle et al. |
| 7,515,076 | B1 |   | 4/2009 | Singh et al. |
| 7,570,182 | B2 |   | 8/2009 | Sheba et al. |
| 7,920,006 | B1 |   | 4/2011 | Keramat et al. |
| 7,924,193 | B2 |   | 4/2011 | Lin et al. |
| 7,987,382 | B2 |   | 7/2011 | Badaroglu |

(Continued)

OTHER PUBLICATIONS

Office Action mailed Oct. 6, 2014; for May et al., "Radio Frequency (RF) Receivers With Whitened Digital Clocks and Related Methods", U.S. Appl. No. 14/062,958, filed Oct. 25, 2013, 16 pgs.

(Continued)

*Primary Examiner* — Rahel Guarino
(74) *Attorney, Agent, or Firm* — Egan, Peterman, Enders & Huston LLP (57) ABSTRACT

Radio frequency (RF) receivers having whitened digital frame processing and related methods are disclosed. Disclosed embodiments whiten frequency domain interference generated periodic current pulses from by digital frame processing by applying a variable time delay to the frame control signals that initiate digital frame processing. For one embodiment, the variable time delay is achieved by waiting a variable number of digital clock cycles for each digital frame processing cycle. Still further, a variable number of no operation (NO-OP) cycles can be performed at the beginning of each frame processing cycle to provide the variable time delay for the variable number of digital clock cycles. Other variable time delay techniques could also be utilized while still taking advantage of the whitened digital frame processing embodiments described herein.

20 Claims, 7 Drawing Sheets

(56) References Cited

U.S. PATENT DOCUMENTS

| | | |
|---|---|---|
| 8,331,887 B2 | 12/2012 | Tuttle et al. |
| 8,548,031 B2 | 10/2013 | Djadi et al. |
| 9,042,499 B2 | 5/2015 | May et al. |
| 2002/0138780 A1 | 9/2002 | Bock |
| 2006/0073793 A1 | 4/2006 | Welland et al. |
| 2008/0118013 A1 | 5/2008 | Vis et al. |
| 2008/0119230 A1 | 5/2008 | Guda et al. |
| 2011/0115537 A1 | 5/2011 | May et al. |
| 2011/0150045 A1 | 6/2011 | Thompson et al. |
| 2011/0158298 A1 | 6/2011 | Djadi et al. |
| 2011/0181325 A1 | 7/2011 | May et al. |
| 2012/0075134 A1 | 3/2012 | Rogers et al. |
| 2012/0099625 A1 | 4/2012 | Djadi et al. |

OTHER PUBLICATIONS

Response to Office Action filed Feb. 6, 2015; for May et al., "Radio Frequency (RF) Receivers With Whitened Digital Clocks and Related Methods", U.S. Appl. No. 14/062,958, filed Oct. 25, 2013, 8 pgs.

Patent Application, May et al., "Radio Frequency (RF) Receivers With Whitened Digital Clocks and Related Methods", U.S. Appl. No. 14/062,958, filed Oct. 25, 2013, 23 pgs.

* cited by examiner

RADIO FREQUENCY (RF) RECEIVERS HAVING WHITENED DIGITAL FRAME PROCESSING AND RELATED METHODS

TECHNICAL FIELD OF THE INVENTION

This invention relates to radio frequency (RF) receivers and digital processors for RF receiver integrated circuits.

BACKGROUND

Current radio frequency (RF) receiver integrate circuits (ICs) often convert analog signals associated with RF input signals to digital samples and then perform digital processing on these digital samples. In addition, some digital processors operate on data frames that are generated by aggregating a number of digital samples together into a data frame. As such, digital samples are generated from the RF input signals, combined into data frames, and then processed by one or more digital processors to generate digital output data representing the information contained within the RF transmissions. As part of this digital frame processing, digital clocks are utilized to operate digital circuitry within the digital processors. Periodic current pulses associated with this digital circuitry and the digital frame processing can generate frequency domain interference that interferes with the RF signals being received and processed by the RF receiver ICs.

Figure 1:
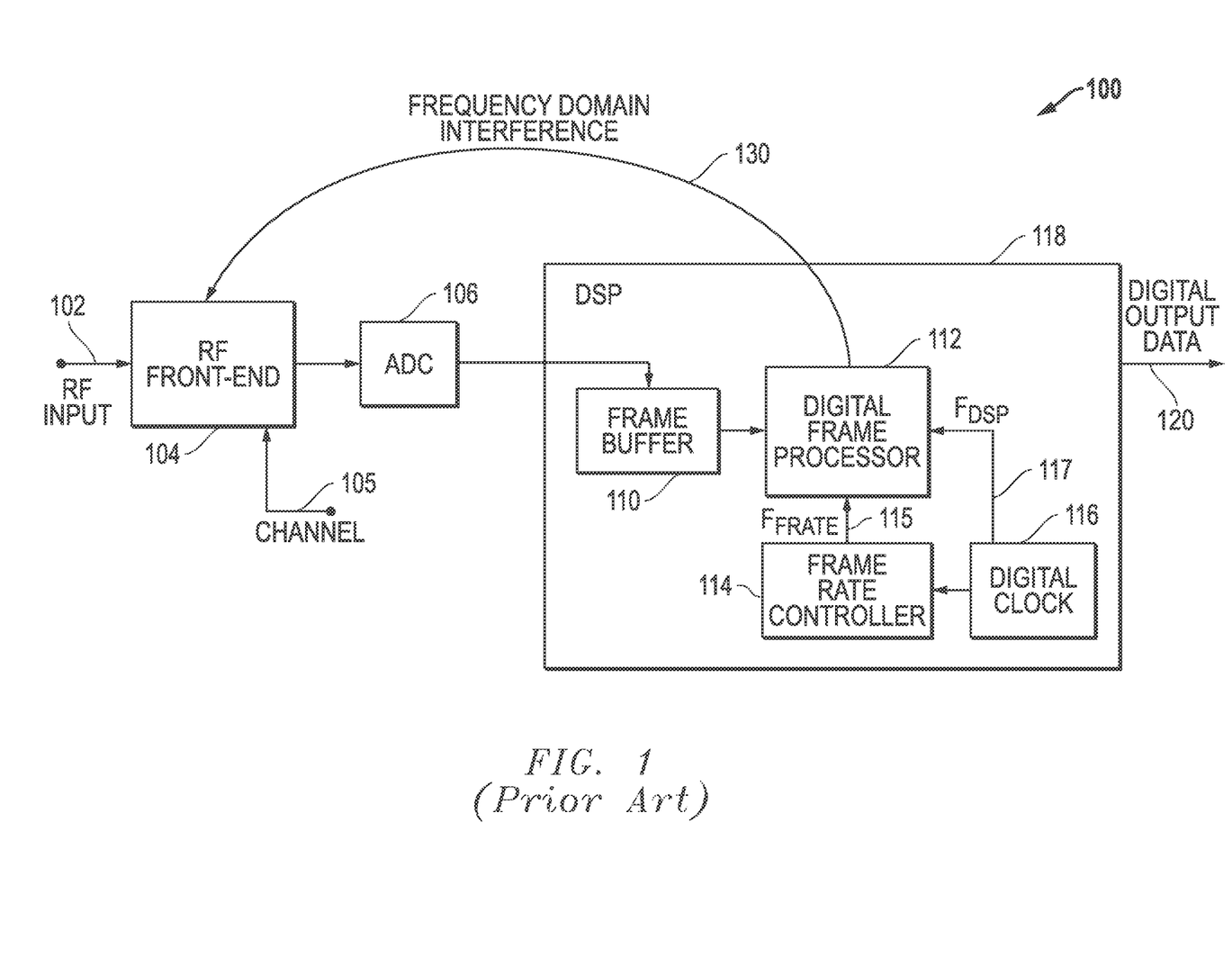
FIG. 1 (Prior Art) is a block diagram of an embodiment for a radio frequency (RF) receiver integrated circuit (IC) that performs digital frame processing.

FIG. 1 (Prior Art) is a block diagram of an embodiment 100 for an RF receiver IC that performs digital frame processing. Looking first to the analog portion of embodiment 100, the RF front-end 104 is configured to receive RF input signals 102, for example, an RF signal spectrum received from an antenna. The RF front-end 104 processes these RF input signals 102 and outputs analog signals associated with the RF input signals 102 to the analog-to-digital converter (ADC) 106. It is noted that the RF front-end 104 can provide filtering, gain adjustment, and/or other desired analog processing to the RF input signals 102. The RF front-end 104 can also be configured to receive a channel select signal 105 that determines a channel within the RF signal spectrum that will be tuned by the RF receiver IC 100. For example, the channel can be one of a number of different channels broadcast within a frequency band (e.g., AM radio, FM radio, television broadcasts, etc.). Further, in some embodiments, the RF front-end 104 can include a mixer and a local oscillator that are used to down-convert the RF signal spectrum to a lower frequency, such as a zero or non-zero intermediate frequency (IF), prior to the analog signals being converted to digital samples by the ADC 106. For other embodiments, no mixers are used, and the RF signal spectrum is directly digitized by the ADC 106.

Looking now to the digital portion of embodiment 100, the ADC 106 receives the analog signals from the RF front-end 104 and converts them into digital data samples. The digital data samples are then received and digitally processed by digital signal processor (DSP) 118 to generate digital output data 120 that can be output to additional circuitry and/or processing blocks. The digital signal processor 118 in part includes a frame buffer 110, a digital frame processor 112, a frame rate controller 114, and a digital clock 116. The digital signal processor 118 can also include digital channel filters, digital decimation, and/or other digital processing blocks.

In operation, the digital data samples from the ADC 106 are stored in the frame buffer 110, which can be a memory circuitry such as dynamic random access memory (DRAM) circuitry or other desired data storage medium. The digital frame processor 112 receives digital data frames that each include a block of digital samples from the frame buffer 110 and processes these digital data frames to generate the digital output data 120. The frame rate controller 114 provides frame control signal 115 to the digital frame processor 112 to indicate when to start the processing of each data frame and thereby control the frame processing rate ($F_{FRATE}$). The digital clock 116 provides digital clock signals 117 at a digital clock frequency ($F_{DSP}$) to the frame rate controller 114 and to the digital frame processor 112. The frame rate controller 114 toggles the logic levels of the frame control signal 115 at periodic intervals associated with cycles of the digital clock 116, and the digital frame processor uses the frame control signal 115 to start its processing of each digital data frame. The digital frame processor 112 uses the cycles of the digital clock 116 to perform its digital processing operations. Periodic current pulses due to the digital switching within the digital frame processor 112 as it operates to process the data frames causes frequency domain interference 130 that can interfere with the RF input signals 102 being received by the RF front-end 104 and thereby degrade the performance of the RF receiver IC 100.

Figure 2A:
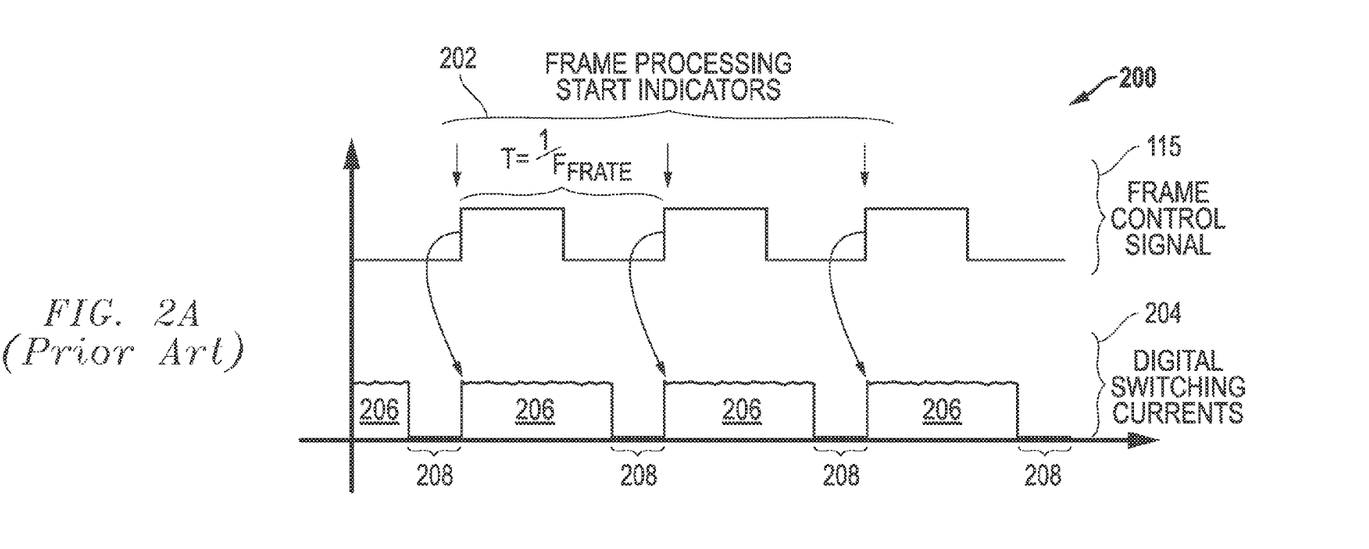
FIG. 2A (Prior Art) is a signal diagram of an embodiment for the frame control signal and digital switching currents associated with the digital frame processor in FIG. 1 (Prior Art).

FIG. 2A (Prior Art) is a signal diagram of an embodiment 200 for the frame control signal 115 and digital switching currents 204 associated with the digital frame processor 112 in FIG. 1 (Prior Art). The frame control signal 115 toggles logic levels at periodic intervals having a frame rate ($F_{FRATE}$) such that the period (T) of each cycle is $T=1/F_{FRATE}$. In one embodiment, the rising edges of the frame control signal 115 are used as frame processing start indicators as represented by arrows 202, although both edge transitions could also be used if desired. At each of these rising edge transitions, the digital frame processor 112 begins processing of a new frame of data samples. As shown with respect to the digital switching currents 204, each of these frame processing cycles causes digital switching currents that will follow a similar pattern for each frame processing cycle. Initially, for each processed frame, these currents 204 will rise in portions 206 as the data frame is processed. These currents 204 then drop to low levels in portions 208 as the digital frame processor 112 enters an idle mode after it completes frame processing within each frame processing cycle. The repeating current pulses in portions 208 caused by the digital frame processing leads to frequency domain interference 130 that can degrade performance.

Figure 2B:
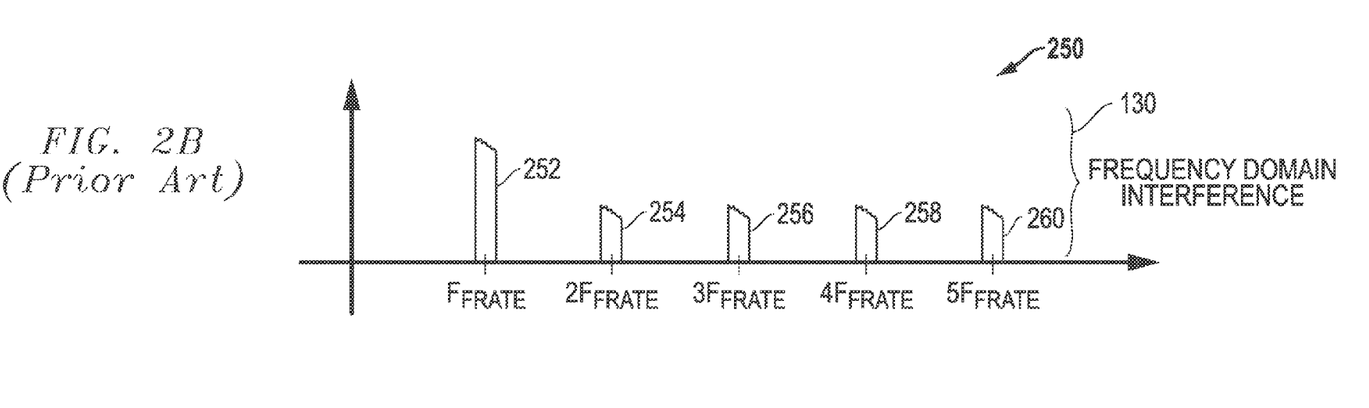
FIG. 2B (Prior Art) is a frequency signal diagram of an embodiment for frequency domain interference from the periodic current pulses depicted in FIG. 2A (Prior Art).

FIG. 2B (Prior Art) is a frequency signal diagram of an embodiment 250 for frequency domain interference 130 from the periodic current pulses depicted in FIG. 2A (Prior Art) that are generated from the digital switching operations during digital frame processing. Frequency domain interference 252 is associated with the base frame rate ($F_{FRATE}$) due to the digital switching within the digital frame processor 112 and the resulting current pulses shown in FIG. 2A (Prior Art) for the digital switching currents 204. Further, frequency domain interference is also associated with harmonics of the base frame rate frequency ($F_{FRATE}$), such as interferences with respect to the second harmonic ($2F_{FRATE}$) 254, the third harmonic ($3F_{FRATE}$) 256, the fourth harmonic ($4F_{FRATE}$) 258, and the fifth harmonic ($5F_{FRATE}$) 260. This frequency domain interference 103 can potentially overlap and interfere with frequencies of interest within the RF input signals 102 and thereby degrade performance of the RF receiver IC 100.

SUMMARY OF THE INVENTION

Radio frequency (RF) receivers having whitened digital frame processing and related methods are disclosed. Disclosed embodiments whiten frequency domain interference generated by periodic current pulses from digital frame processing by applying a variable time delay to the frame control signals that initiate digital frame processing. For one embodiment, the variable time delay is achieved by waiting a variable number of digital clock cycles for each digital frame processing cycle. Still further, a variable number of no operation (NO-OP) cycles can be performed at the beginning of each frame processing cycle to provide the variable time delay for the variable number of digital clock cycles. Other variable time delay techniques could also be utilized while still taking advantage of the whitened digital frame processing embodiments described herein. In addition, other features and variations could also be implemented, as desired, and related systems and methods can be utilized, as well.

For one embodiment, a method for operating a receiver system is disclosed that includes receiving a radio frequency (RF) signal spectrum, converting analog signals associated with the radio frequency (RF) signal spectrum to digital samples, generating digital frames including blocks of multiple digital samples, and digitally processing the digital frames with a digital processor to generate digital output data where the receiving, converting, generating, and digitally processing steps are performed within a single integrated circuit. The digital processing of each digital frame by the digital processor further includes receiving a frame control signal indicating a start for the digital processing of the digital frame, waiting for a variable time delay, and initiating digital processing of the digital frame after the variable time delay.

In other embodiments, the method further includes using a digital clock signal for the digital processing by the digital processor. In addition, the waiting step can include waiting a variable number of clock cycles of the digital clock signal to provide the variable time delay. The method can also include performing a plurality of no-operation commands by the digital processor to wait the variable number of clock cycles. Further, the method can include generating a random number and using the random number to determine the variable number of clock cycles. Still further, the method can include restricting the variable number of clock cycles to a selected range of numbers.

In further embodiments, the method includes using logic level transitions for the frame control signal to indicate the start of the digital processing of the digital frame. In addition, the method can include using a digital clock signal for the digital processing by the digital processor, and wherein the frame control signal is based upon the digital clock signal.

In still further embodiments, the method includes storing the digital samples in a frame buffer prior to the generating step. In addition, the RF signal spectrum can include a plurality of channels, and the digital output data can represent content within a selected channel.

For another embodiment, a receiver system is disclosed includes a radio frequency (RF) front-end configured to receive an RF signal spectrum and to output analog signals associated with the RF signal spectrum, an analog-to-digital converter (ADC) coupled to receive the analog signals and to output digital samples associated with the analog signals, and a digital processor coupled to receive the digital samples and to digitally process the digital samples where the RF front-end, the ADC, and the digital processor are integrated within a single integrated circuit. The digital processor further includes a frame buffer coupled to receive and store the digital samples, and a frame processor coupled to receive digital frames including blocks of multiple digital samples from the frame buffer and to initiate digital processing of each frame based upon a frame control signal delayed by a variable time delay.

In other embodiments, the receiver system further includes a digital clock configured to output a digital clock signal to the digital processor, and the digital processor is configured to use the digital clock signal for digital processing. In addition, the variable time delay can include a variable number of clock cycles for the digital clock signal. The digital processor can also be configured to perform a plurality of no-operation commands associated with the variable number of clock cycles. Further, the digital processor can be configured to generate a random number generator and to use the random number to determine the variable number of clock cycles. Still further, the digital processor can be configured to restrict the variable number of clock cycles to a selected range of numbers.

In further embodiments, the frame processor can be configured to use logic level transitions for the frame control signal as an indication of when to start digital processing of each digital frame. In addition, the receiver system can further include a digital clock configured to output a digital clock signal to the digital processor and a frame rate controller configured to output the frame control signal based upon the digital clock signal.

In still further embodiments, the RF signal spectrum can include a plurality of channels, and the digital output data can represent content within a selected channel. In addition, the plurality of channels can include a plurality of audio broadcast channels.

Other features and variations could also be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Radio frequency (RF) receivers having whitened digital frame processing and related methods are disclosed. Disclosed embodiments whiten frequency domain interference generated by periodic current pulses from digital frame processing by applying a variable time delay to the frame control signals that initiate digital frame processing. For one embodiment, the variable time delay is achieved by waiting a variable number of digital clock cycles for each digital frame processing cycle. Still further, a variable number of no operation (NO-OP) cycles can be performed at the beginning of each frame processing cycle to provide the variable time delay for the variable number of digital clock cycles. Other variable time delay techniques could also be utilized while still taking advantage of the whitened digital frame processing embodiments described herein. In addition, other features and variations can be implemented for the embodiments described herein, and related systems and methods can be utilized, as well.

Figure 3:
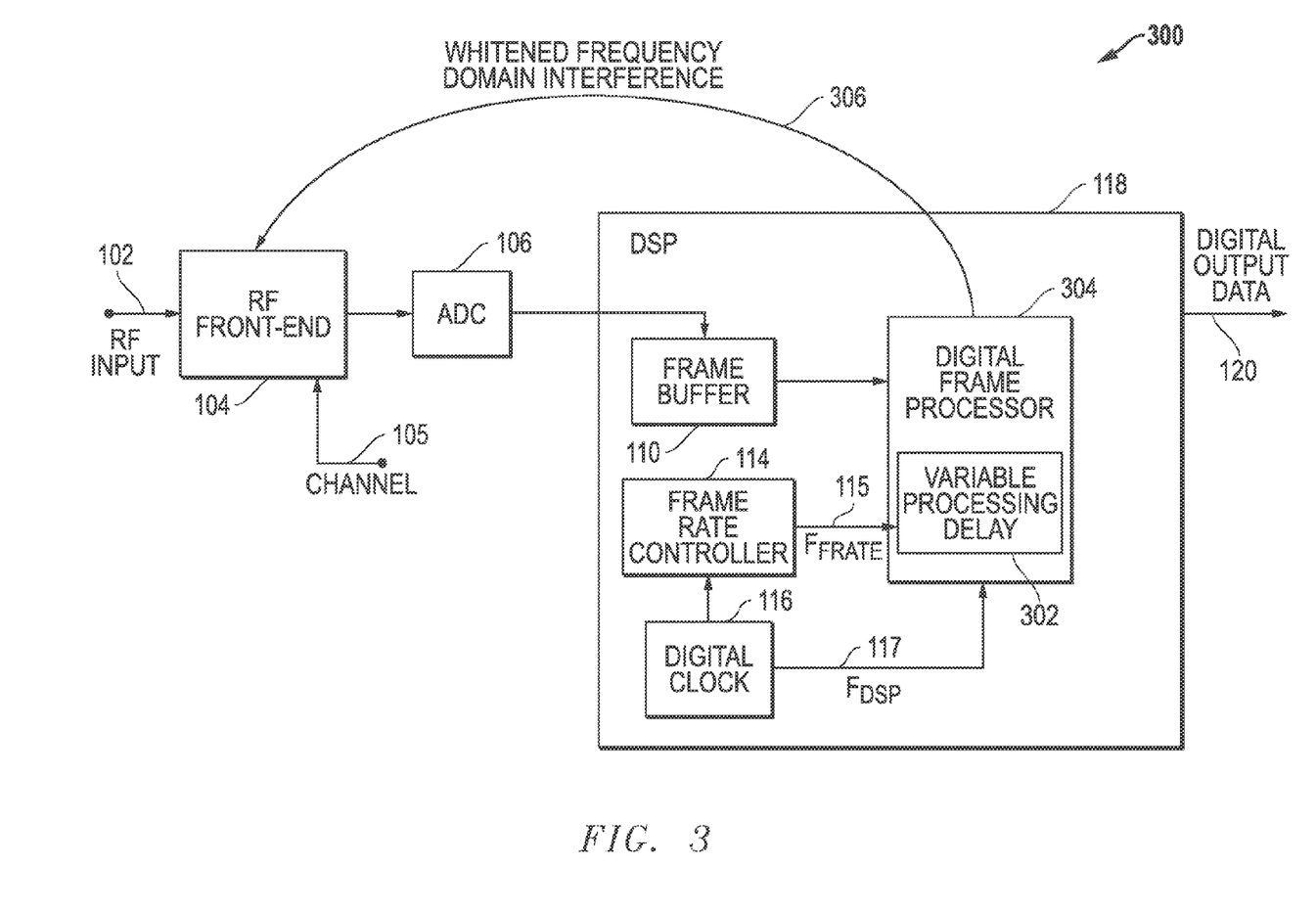
FIG. 3 is a block diagram of an embodiment for an RF receiver IC that performs digital frame processing using a variable processing delay block to whiten frequency domain interference.

FIG. 3 is a block diagram of an embodiment 300 for an RF receiver IC that performs digital frame processing using a variable processing delay block 302 to whiten frequency domain interference 306. As with FIG. 1 (Prior Art), the RF front-end 104 processes these RF input signals 102 and outputs analog signals associated with the RF input signals 102 to the analog-to-digital converter (ADC) 106. It is again noted that the RF front-end 104 can provide filtering, gain adjustment, and/or other desired analog processing to the RF input signals 102. The RF front-end 104 can also be configured to receive a channel select signal 105 that determines a channel within the RF signal spectrum that will be tuned by the RF receiver IC 300. For example, the channel can be one of a number of different channels broadcast within a frequency band (e.g., AM radio, FM radio, television broadcasts, etc.). Further, in some embodiments, the RF front-end 104 can include a mixer and a local oscillator that are used to downconvert the RF signal spectrum to a lower frequency, such as a zero or non-zero intermediate frequency (IF), prior to the analog signals being converted to digital samples by the ADC 106. For other embodiments, no mixers are used, and the RF signal spectrum is directly digitized by the ADC 106.

As also with FIG. 1 (Prior Art), the analog-to-digital converter (ADC) 106 receives the analog signals from the RF front-end 104 and converts them into digital data samples. These digital data samples are then received and digitally processed by the digital signal processor (DSP) 118 to generate digital output data 120 that can be output to additional circuitry and/or processing blocks. The digital signal processor 118 in part can again includes a frame buffer 110, a digital frame processor 304, a frame rate controller 114, and a digital clock 116. The digital signal processor 118 can also include digital channel filters, digital decimation, and/or other digital processing blocks.

In operation, the digital data samples from the ADC 106 are stored in the frame buffer 110, which can be a memory circuitry such as dynamic random access memory (DRAM) circuitry or other desired data storage medium. The digital frame processor 112 receives digital data frames that each include a block of digital samples from the frame buffer 110 and processes these digital data frames to generate the digital output data 120. The frame rate controller 114 provides frame control signal 115 to the digital frame processor 112 to indicate when to start the processing of each data frame and thereby control the frame processing rate ($F_{FRATE}$). The digital clock 116 provides digital clock signals 117 at a clock frequency ($F_{DSP}$) to the frame rate controller 114 and to the digital frame processor 112. The frame rate controller 114 toggles the logic levels of the frame control signal 115 at periodic intervals associated with cycles of the digital clock 116, and the digital frame processor uses the frame control signal 115 start its processing of each digital data frame. The digital frame processor 112 uses the cycles of the digital clock 116 to perform its digital processing operations.

In contrast with FIG. 1 (Prior Art), however, embodiment 300 of FIG. 3 includes a variable processing delay block 302 associated with the digital frame processor 304 that adds a variable time delay to the start of each frame processing cycle as initiated by the frame control signal 115 from the frame rate controller 114. For example, rather than start the processing of each data frame periodically at one or more of the logic transitions for the frame control signal 115, the digital frame processor 304 starts the processing of each data frame after a variable time delay from one or more of these logic transitions, where the variable time delay is provided by the variable processing delay block 302. As such, while the periodic current pulses due to the digital switching within the digital frame processor 304 still causes frequency domain interference 306, this frequency domain interference 306 is whitened by the variable processing time delays such that interference with the RF input signals 102 is greatly reduced as compared to embodiment 100 of FIG. 1 (Prior Art).

Figure 4A:
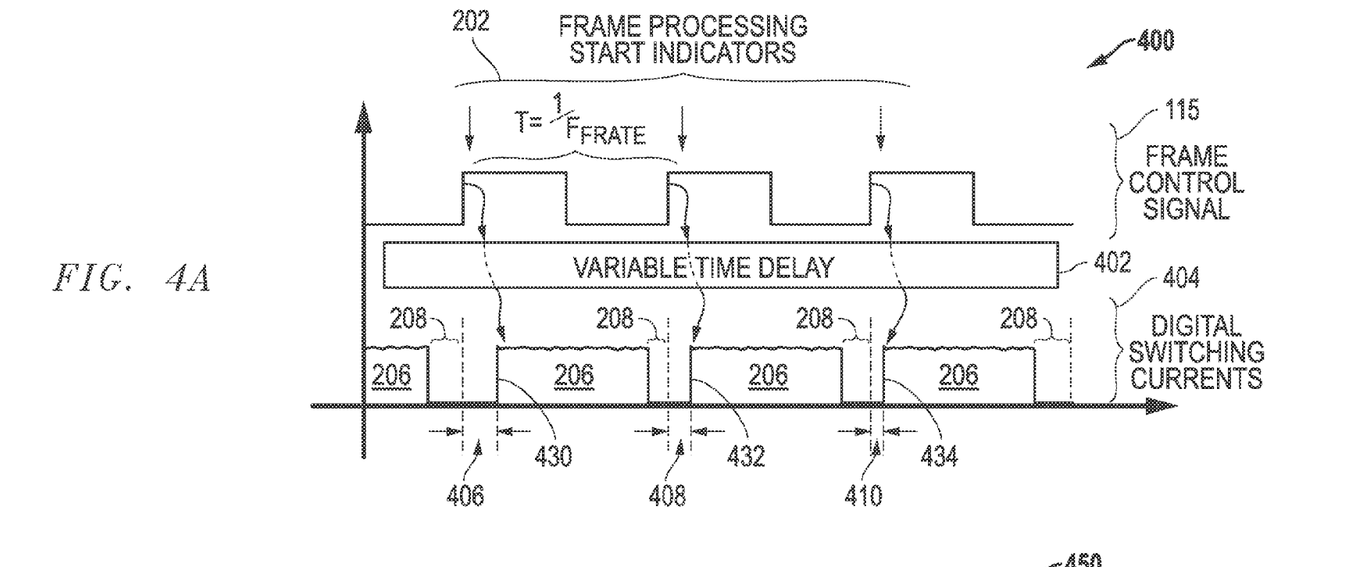
FIG. 4A is a signal diagram of an embodiment for the frame control signal and digital switching currents associated with the digital frame processor in FIG. 3.

FIG. 4A is a signal diagram of an embodiment 400 for the frame control signal 115 and digital switching currents 404 associated with the digital frame processor 304 in FIG. 3. The frame control signal 115 toggles logic levels at period intervals having a frame rate ($F_{FRATE}$) such that the period (T) of each cycle is $T=1/F_{FRATE}$. In one embodiment, the rising edges of the frame control signal 115 are used as frame processing start indicators as represented by arrows 202, although both edges could also be used if desired. At each of these rising edge transitions, a variable time delay 402 is added by the variable processing delay block 302, as described herein. As such, the digital frame processor 304 begins processing of each new frame of data samples at a variable time delay or time offset from the start indicator transitions 202 for the frame control signal 115. These variable time delays are represented by the time delays 406, 408, and 410 between the start indicator transitions 202 for the frame control signal 115 and the start of the frame processing as represented by edges 430, 432, and 434 for the digital switching currents 404. The digital switching currents 404 represent the digital switching currents associated with the frame processing by the digital frame processor 304. As with FIG. 2A (Prior Art), these currents 204 will initially rise in portions 206 as each data frame is processed. These currents 404 then drop in portions 208 to low levels as the digital frame processor 112 enters an idle mode after it completes frame processing within each frame processing cycle. However, because the variable time delays 406, 408, and 410 cause the resulting current pulses to be offset in time from the periodic frame start indicator transitions 202, the resulting frequency domain interference 306 is effectively whitened thereby significantly reducing interference as compared to the frequency domain interference 130 caused in FIG. 1 (Prior Art).

It is noted that the frame rate ($F_{FRATE}$), the frame period (T), and the digital clock frequency ($F_{DSP}$) can be selected as desired depending upon the sampling rates for the ADC 106, the size of the blocks of samples used for the digital data frames, and/or other considerations. As one example, the frame period (T) can be about 40-50 microseconds (μs), the frame rate ($F_{FRATE}$) can be about 20-25 kilo-Hertz (kHz), and the digital clock frequency ($F_{DSP}$) can be about 90-110 mega-Hertz (MHz). Still further, the sample rate for the ADC 106 can be between 50-70 MHz and digital data frames can include 1000-3500 samples. The sample rate can also be further decimated down to a lower rate, for example, using digital front-end (DFE) circuitry, and the data samples can be aggregated together to form larger bit samples, as described with respect to FIG. 7 below. As such, the number of samples for each digital data frame, as well as the size of these samples, can be adjusted and selected as desired. In one further embodiment, thirty-two (32) samples that are each 24-bits are included within a digital data frame. It is further noted that the variable time delay can also be selected as desired and can further be restricted to a range of delay values. For example, the variable time delay can be selected as a time delay value between 0 and 2 μs. Other variations and values could also be selected and used while still taking advantage of the whitened digital frame processing embodiments described herein.

Figure 4B:
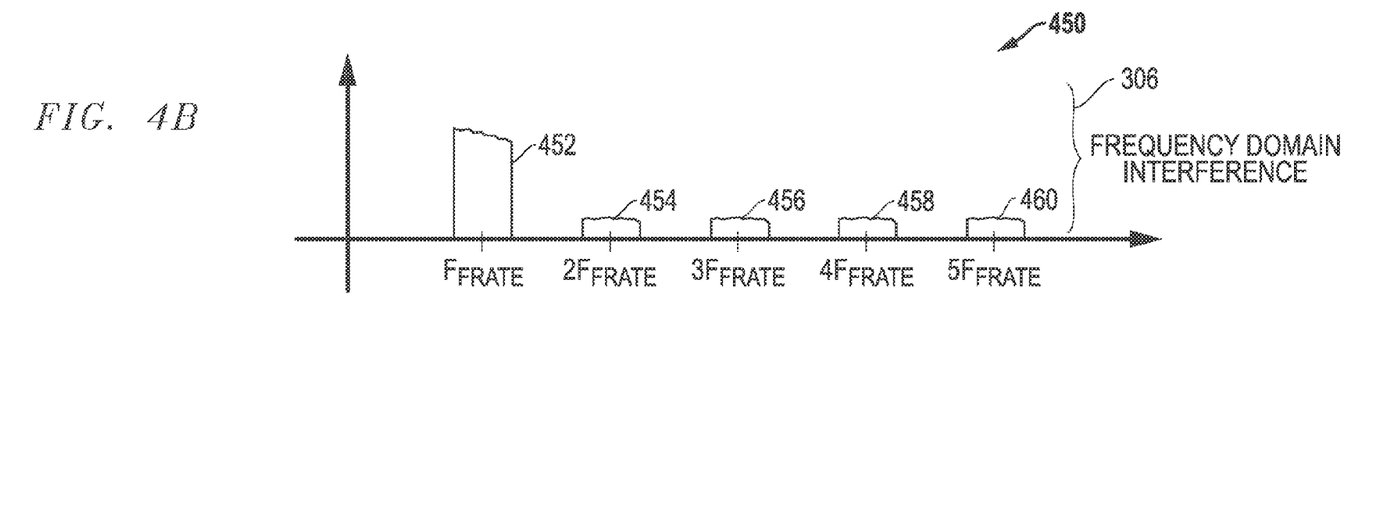
FIG. 4B is a frequency signal diagram of an embodiment for whitened frequency domain interference from the periodic current pulses depicted in FIG. 4A.

FIG. 4B is a frequency signal diagram of an embodiment 450 for frequency domain interference 306 from the periodic current pulses depicted in depicted in FIG. 4A that are generated from the digital switching operations during digital frame processing. Frequency domain interference 452 is associated with the base frame rate frequency ($F_{FRATE}$) due to the digital switching within the digital frame processor 304 and the resulting current pulses shown in FIG. 4A for the digital switching currents 404. Advantageously, due to the variable time delays 402 applied by the variable processing delay block 302, interference 452 is spread across a wider frequency range and thereby has lower magnitude in the frequency region of the desired RF input signal as compared with interference 252 in FIG. 2B (Prior Art). Further, frequency domain interference is also associated with harmonics of the base frame rate frequency ($F_{FRATE}$), such as interferences with respect to the second harmonic ($2F_{FRATE}$) 454, the third harmonic ($3F_{FRATE}$) 456, the fourth harmonic ($4F_{FRATE}$) 458, and the fifth harmonic ($5F_{FRATE}$) 460. Advantageously, as with interference 452, the interferences 454/456/458/460 associated with the harmonics of the frame rate frequency ($F_{FRATE}$) are also spread across a wider frequency range and thereby have lower magnitudes in the frequency region of the desired RF input signal as compared with interferences 254/256/258/260 in FIG. 2B (Prior Art). As such, performance of for RF receiver IC embodiment 300 is greatly improved as compared to RF receiver IC embodiment 100 of FIG. 1 (Prior Art).

Figure 5:
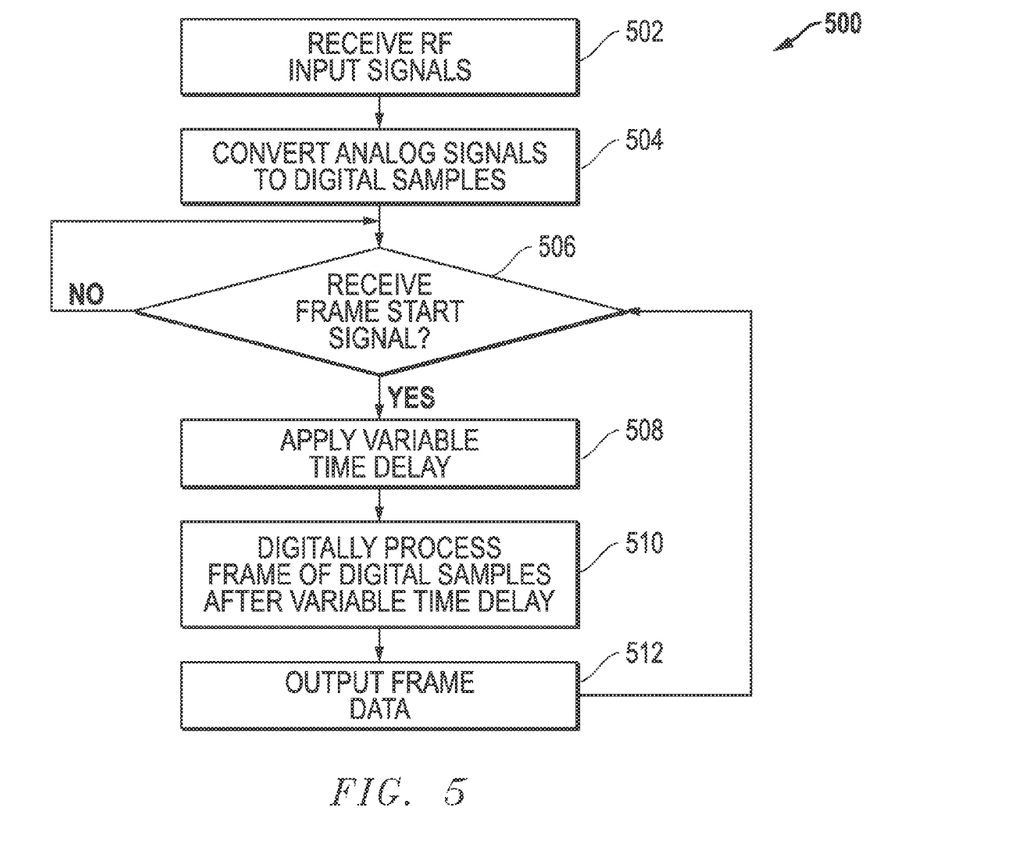
FIG. 5 is a process flow diagram of an example embodiment for digital frame processing using variable time delays for initiating processing of digital frames.

FIG. 5 is a process flow diagram of an example embodiment 500 for digital frame processing using variable time delays for initiating processing of digital frames. In block 502, an RF input signal is received. In block 504, the RF input signals are converted from analog signals to digital samples. In block 506, a determination is made whether a frame start signal has been received. The frame start signal can be, for example, logic level transitions or toggles of a frame control signal 115 from a frame rate controller 114 as described above. If "NO," then flow passes back to block 506. If "YES," then flow passes to block 508 where a variable time delay is applied. Block 510 is the reached where a frame of digital samples is digitally processed by the digital frame processor 304 after the variable time delay. In block 512, the digital frame data is then output and flow passes back to block 506 where a new frame can be processed when the next frame start signal has been received. Other process steps and variations could also be used while still applying variable time delay to the processing of each frame of samples.

Figure 6:
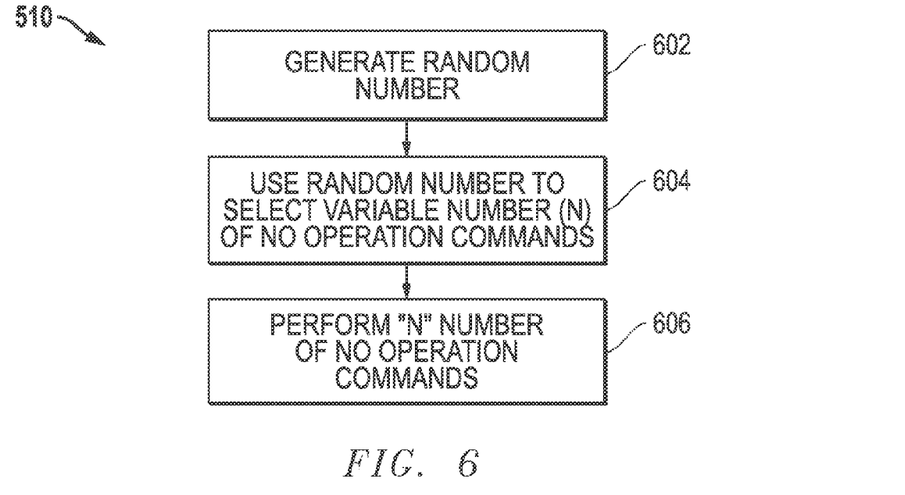
FIG. 6 is a process flow diagram of an example embodiment for applying a variable time delay to the processing of each data frame within the embodiment of FIG. 5.

FIG. 6 is a process flow diagram of an example embodiment for block 508 in FIG. 5 to apply a variable time delay to the processing of each data frame. In block 602, a random number is generated. In block 604, the random number is used to select a variable number (N) of digital clock cycles to wait using no-operation (NO-OP) commands. In block 606, the variable number (N) of no operation commands are then performed by the digital frame processor 304. For each frame processing cycle, therefore, a new random number will be generated such that a variable time delay is applied by causing the digital frame processor 304 to delay its frame processing by a variable number (N) of no-operation commands.

It is noted that a no-operation (NO-OP) command for a digital processor or other processing device is a clock cycle for the digital clock being used by the digital processor in which the digital processor is idle or waiting. Many processing devices use a no-operation (NO-OP) command to place the processing device in this waiting or idle state during one or more clock cycles. Other processing devices us a wait (WAIT) command to place the processing device in such a waiting or idle state. It is further noted that other commands could still be used while still causing the digital frame processor 304 to wait for the variable time delay in each frame processing cycle before beginning the digital frame processing.

Further, it is noted that the random number generator can generate a random number (R) from 1 to X, where X represents the maximum number that can be generated by the random number generator. Still further, it is noted that that variable number (N) of no-operation commands can be selected to be within a selected range. This selected range can be, for example, from 0 to M no-operation commands, where M is the maximum number of no-operation commands desired to be performed prior to initiating the frame processing. In one implementation, a range of 0 to M no-operation commands can be selected by applying a modulo operation that divides the random number (R) by the maximum number (M) of no-operation commands and returns the remainder. The remainder can then be used as the selected number (N) of clock cycles for the digital processor to wait, for example, by performing this selected number (N) of no-operation commands. For example, the following operation could be used: N=R MOD M, where "MOD" represents a modulo n operation that returns the remainder of R divided by M. As such, N will be a number from 0 to M based upon the random number (R) generated by the random number generator. With respect to the random number generator and the modulo operations, the digital signal processor 118 or the digital frame processor 304 can be configured to perform these operations. It is also noted that other techniques could also be used, as desired, for selecting a variable number (N) of no-operation commands or other wait commands using a random number (R). Further, other techniques could also be used for selecting a variable number (N) of no-operation or wait commands that do not use a random number while still taking advantage of the variable frame processing delay techniques described herein.

Figure 7:
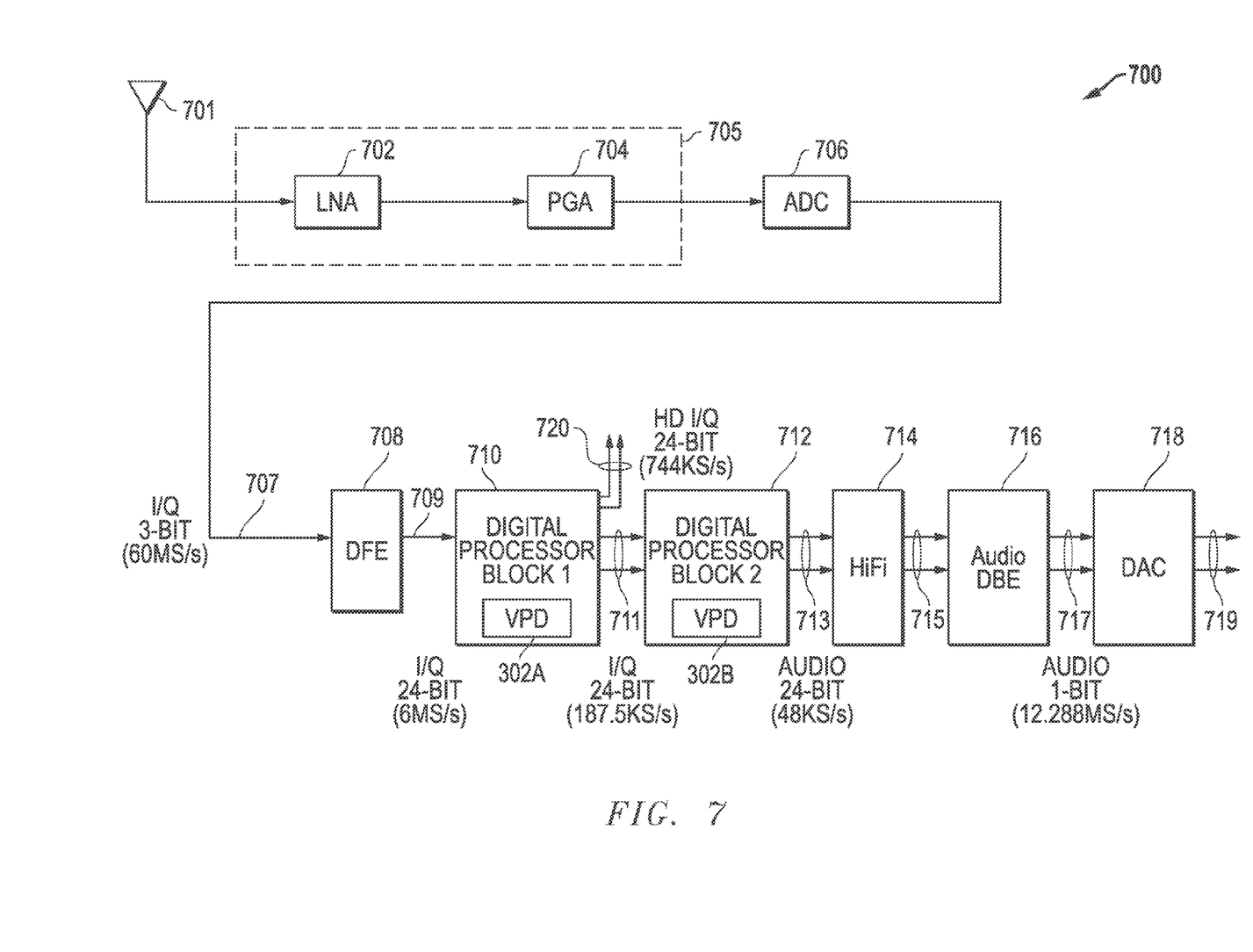
FIG. 7 is a block diagram of an embodiment for an RF audio broadcast receiver that includes one or more variable processing delay (VPD) blocks.

FIG. 7 is a block diagram of an embodiment 700 for an RF audio broadcast receiver that includes one or more variable processing delay (VPD) blocks 302A/302B. RF input signals are received at an antenna 701 and provided to an RF front-end 705 that includes a low noise amplifier (LNA) 702 and a programmable gain amplifier (PGA) 704. It is also noted that a mixer could also be provided if the RF front-end 705 is configured to down-convert the RF signal spectrum to a lower frequency range. It is further noted that embodiment 700 could also be configured to receive a channel select signal to indicate a channel of interest within the RF input signals received from the antenna 701.

The output of the RF front-end 705 is provided to ADC 706. The digital samples 707 from the ADC 706 are then provided to digital front-end (DFE) 708 that can apply digital filtering, digital mixing, digital decimation, and/or other signal conditioning. The DFE 708 can also be configured to operate at an intermediate frequency (IF), for example, where a digital mixer may be used to down-convert a desired channel to a desired IF. The digital signals from the DFE 708 are then processed by a first digital processor block 710 and a second digital processor block 712 to generate left (L) and right (R) audio output signals 713. The audio output signals 713 are then processed by high fidelity (HiFi) processor 714 and audio digital back end (DBE) processor 716 to generate high quality left (L) and right (R) audio signals 717 as a single bit data stream. This single bit data stream 717 can then be converted to analog audio signals 719 by digital-to-analog converter (DAC) 718.

As described herein, one or both of the digital processor blocks 710/712 are configured to process digital samples from the ADC 706 in frames and to apply a variable time delay to this frame processing. As such, one or both of the digital processing blocks 710/712 can include a variable processing delay block 302A/302B to whiten the frequency domain interference generated by the digital frame processing being conducted by the digital processor blocks 710/712, respectively. For the embodiment depicted, the first digital processor block 710 includes variable processing delay block 302A, and the second digital processor block 712 includes variable processing delay block 302B. As described above, each of these variable processing delay blocks 302A/302B can be used to apply a variable time delay that whitens frequency domain interference from digital frame processing by spreading this interference across a wider frequency range associated with the frame rate frequencies used for the digital frame processing and harmonics of these frequencies.

For the example embodiment 700, the ADC 706 is a complex analog-to-digital converter, and the digital samples 707 from the ADC 706 are 3-bit real (I) and imaginary (Q) values output at 60 mega-samples per second (MS/s). The output of the IF DFE 708 are decimated and aggregated to be 24-bit I/Q samples output at 6 MS/s. The first digital processor block 710 processes these digital samples and generates high-definition (HD) digital I/Q signals 720 that are 24-bit I/Q values output at 744 kilo-samples per second (kS/s). The first digital processor block 710 also outputs lower quality digital I/Q signals 711 that are 24-bit I/Q values output at 187.5 kilo-samples per second (kS/s). The second digital processor block 712 processes the digital I/Q signals 711 and produces left (L) and right (R) audio signals 713 that are 24-bit values output at 48 kilo-samples per second (kS/s). After processing by the HiFi processor 714, the audio DBE 716 then process the audio signals to generate the single-bit L/R audio output stream 717 at 12.2888 mega-samples per second (MS/s).

As a further example embodiment, it is noted that the DFE 708 can be configured to provide digital filtering, to down-sample the 60 MS/s digital samples 707, and to output data samples at 6 MS/s. This digital processing function may be performed, for example, using a CIC (cascaded integrator-comb) filter that includes a cascade of integrators and a comb filter. DFE 708 may also include a digital mixing operation to position the desired signal at a particular IF frequency. It is also noted that the first digital processor block 710 can be configured to filter close-in RF blockers and to remove DC offsets in the incoming signal, so that the desired signal will be in better condition for demodulation. Further, it is noted that the second digital processor block 712 can be configured to demodulate the desired signal. In the case of a desired signal that is a channel with the FM broadcast band, the digital processor block 712 can be configured to perform FM demodulation, de-emphasis, impulse noise suppression, soft mute, RDS (radio data system) processing, and/or other demodulation related processing. Still further, it is noted that the HiFi processor 714 can be configured to perform audio processing on the digital signal. For example, the digital signal could be sample-rate converted to a rate optimized for later processing blocks; other audio signals could be multiplexed in with the digital signal; frequency domain equalization could be performed; and/or other audio processing could be provided. In addition, it is noted that the audio DBE 716 can be configured to up-sample and filter the digital signal for use by the DAC block 718 that drives the analog audio signals out of the receiver IC. The DBE 716 can also contain, for example, a sigma-delta modulator that reduces the number of bits sent to the DAC block 718. The DBE 716 can also be configured to band-limit the digital signals to the DAC block 718 to reduce out of band energy seen by the DAC block 718. Different and/or additional digital blocks and digital processing could also be provided, as desired, while still taking advantage of the whitened digital frame processing embodiments described herein.

Figure 8:
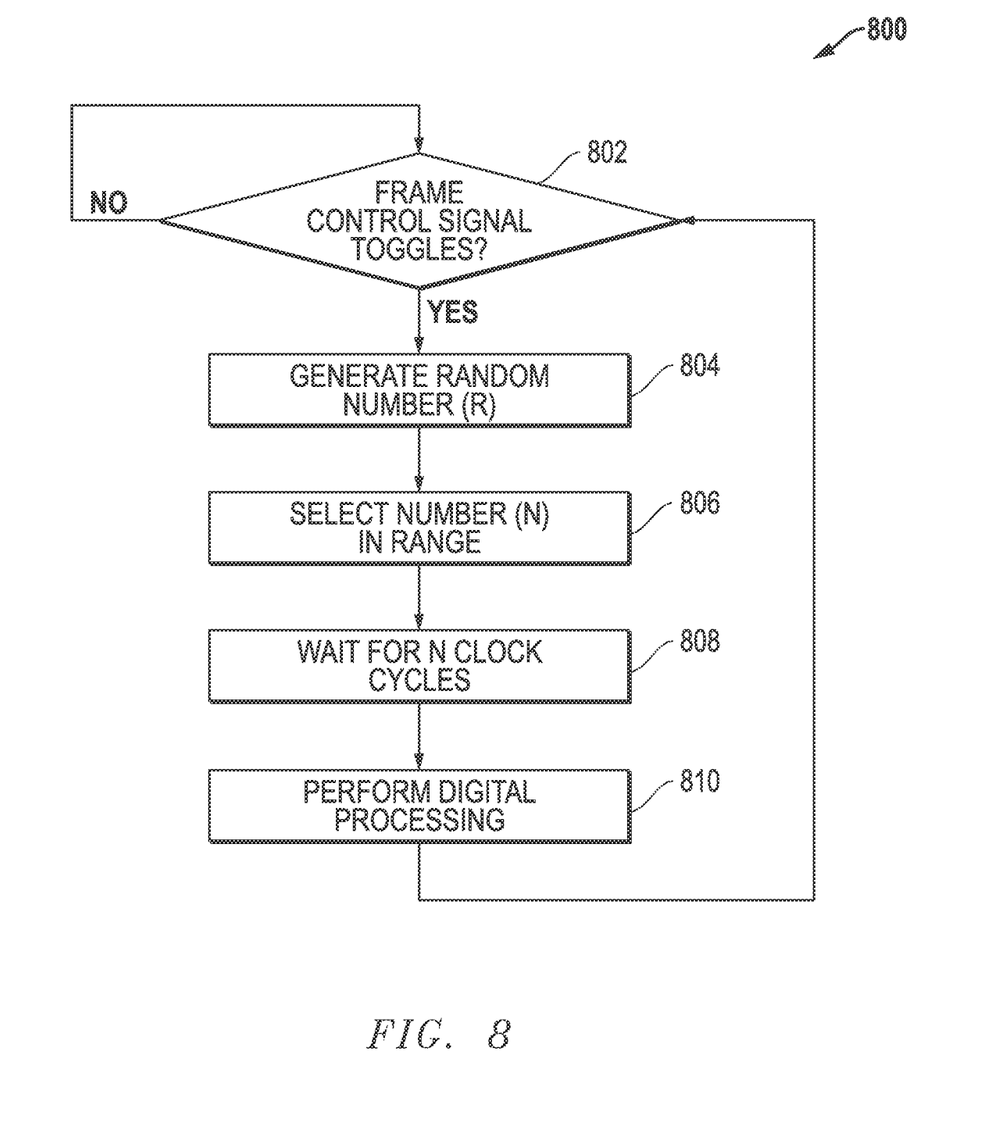
FIG. 8 is a process flow diagram of an embodiment for applying variable time delays with respect to variable processing delay blocks in FIG. 7.

FIG. 8 is a process flow diagram of an embodiment 800 for applying variable time delays with respect to variable processing delay blocks 302A/302B in FIG. 7. In block 802, a determination is made whether a toggle or transition of the frame control signal has been received to indicate the start of processing frame cycle. If "NO," then flow passes back to block 802. If "YES," then flow passes to block 804 where a random number (R) is generated. In block 806, a variable number (N) within a desired range is selected using the random number (R). This selection can be implemented, for example, using a modulo operation as described above and/or using some other desired operation or technique. In block 808, the digital frame processor 710/712 waits for this number (N) of clock cycles before beginning the digital frame processing. In block 810, the digital frame processing is performed. Flow then passes back to block 802 for the next frame to be processed. As such, a variable time delay is applied to each digital frame processing cycle, and this variable time delay effective whitens frequency domain interference caused by the current pulses resulting from the operation of the digital processors 710/712.

It is noted that the random number generators described herein can be implemented, for example, using a linear feedback shift register (LFSR) or using some other desired technique. It is also understood that the random numbers generated can be non-ideal in that they repeat after some interval. It is further noted that a wide variety of receiver architectures can be utilized for the RF receiver IC embodiments described while still utilizing the whitened frame processing techniques described herein. For example, dual down-conversion, low-IF down-conversion, direct down conversion (zero-IF), direct spectrum digitization without down conversion, and/or other desired architectures could be utilized for the RF receiver ICs. It also is noted that the RF receiver IC embodiments described herein can be configured to receive channels within frequency bands across a wide range of frequencies, from thousands of Hertz to gigahertz frequencies and above. Further, the content within the channels for the received frequency bands can include audio, video, data, and/or other desired content or combinations of such content.

It is noted that the functional blocks described herein can be implemented using hardware, software, or a combination of hardware and software, as desired. In addition, one or more processors or other processing devices running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory storage devices, FLASH memory, random access memory, read only memory, programmable memory devices, reprogrammable storage devices, hard drives, floppy disks, DVDs, CD-ROMs, and/or any other tangible storage medium) and that are executed by one or more controllers, microcontrollers, microprocessors, hardware accelerators, processors, and/or other processing devices to perform the operations and functions described herein. It is further understood, therefore, that one or more of the tasks, functions, or methodologies described herein may be implemented, for example, as software or firmware and/or other instructions embodied in one or more non-transitory tangible computer readable mediums that are executed by a CPU (central processing unit), controller, microcontroller, processor, microprocessor, FPGA (field programmable gate array), CPLD (complex configurable logic device), CLD (configurable logic device), ASIC (application specific integrated circuit), or other suitable processing device or combination of such processing devices.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for operating a receiver system, comprising:
   receiving a radio frequency (RF) signal spectrum;
   converting analog signals associated with the radio frequency (RF) signal spectrum to digital samples;
   generating digital frames including blocks of multiple digital samples;
   digitally processing the digital frames with a digital processor to generate digital output data, the digital processing of each digital frame by the digital processor including:
      receiving a frame control signal indicating a start for the digital processing of the digital frame;
      waiting for a variable time delay; and
      initiating digital processing of the digital frame after the variable time delay;
   wherein the receiving, converting, generating, and digitally processing steps are performed within a single integrated circuit.

2. The method of claim 1, further comprising using a digital clock signal for the digital processing by the digital processor.

3. The method of claim 2, wherein the waiting step comprises waiting a variable number of clock cycles of the digital clock signal to provide the variable time delay.

4. The method of claim 3, further comprising performing a plurality of no-operation commands by the digital processor to wait the variable number of clock cycles.

5. The method of claim 3, further comprising generating a random number and using the random number to determine the variable number of clock cycles.

6. The method of claim 3, further comprising restricting the variable number of clock cycles to a selected range of numbers.

7. The method of claim 1, further comprising using logic level transitions for the frame control signal to indicate the start of the digital processing of the digital frame.

8. The method of claim 7, further comprising using a digital clock signal for the digital processing by the digital processor, and wherein the frame control signal is based upon the digital clock signal.

9. The method of claim 1, further comprising storing the digital samples in a frame buffer prior to the generating step.

10. The method of claim 1, wherein the RF signal spectrum comprises a plurality of channels, and wherein the digital output data represents content within a selected channel.

11. A receiver system, comprising:
   a radio frequency (RF) front-end configured to receive an RF signal spectrum and to output analog signals associated with the RF signal spectrum;
   an analog-to-digital converter (ADC) coupled to receive the analog signals and to output digital samples associated with the analog signals;
   a digital processor coupled to receive the digital samples and to digitally process the digital samples, the digital processor comprising:
      a frame buffer coupled to receive and store the digital samples; and
      a frame processor coupled to receive digital frames including blocks of multiple digital samples from the frame buffer and to initiate digital processing of each frame based upon a frame control signal delayed by a variable time delay;
   wherein the RF front-end, the ADC, and the digital processor are integrated within a single integrated circuit.

12. The receiver system of claim 11, further comprising a digital clock configured to output a digital clock signal to the digital processor, the digital processor being configured to use the digital clock signal for digital processing.

13. The receiver system of claim 12, wherein the variable time delay comprises a variable number of clock cycles for the digital clock signal.

14. The receiver system of claim 13, wherein the digital processor is further configured to perform a plurality of no-operation commands associated with the variable number of clock cycles.

15. The receiver system of claim 13, wherein the digital processor is further configured to generate a random number generator and to use the random number to determine the variable number of clock cycles.

16. The receiver system of claim 13, wherein the digital processor is further configured to restrict the variable number of clock cycles to a selected range of numbers.

17. The receiver system of claim 11, wherein the frame processor is configured to use logic level transitions for the frame control signal as an indication of when to start digital processing of each digital frame.

18. The receiver system of claim 17, further comprising a digital clock configured to output a digital clock signal to the digital processor and a frame rate controller configured to output the frame control signal based upon the digital clock signal.

19. The receiver system of claim 11, wherein the RF signal spectrum comprises a plurality of channels, and wherein the digital output data represents content within a selected channel.

20. The receiver system of claim 19, wherein the plurality of channels comprises a plurality of audio broadcast channels.

* * * * *